Patented Mar. 24, 1931

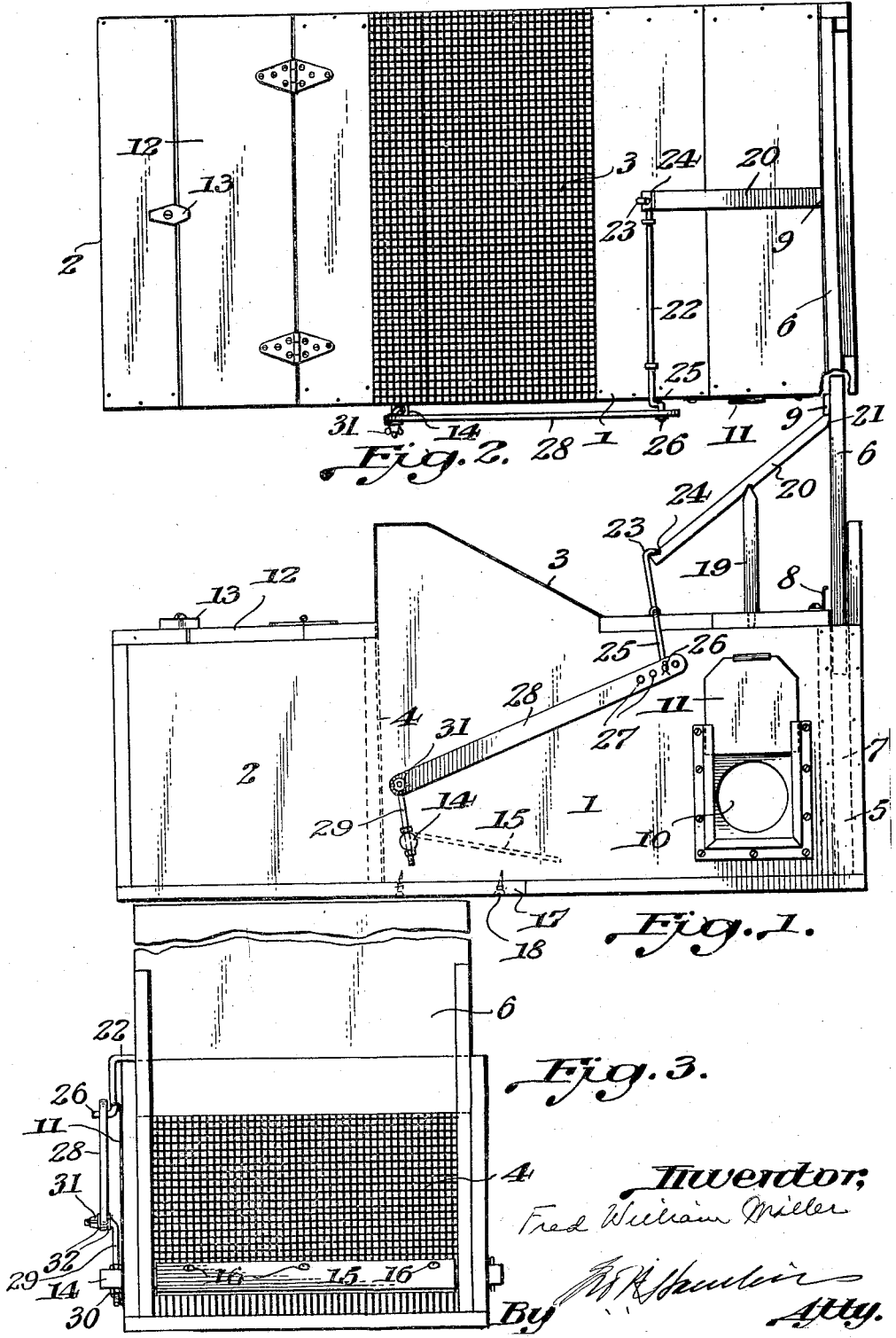

1,797,784

UNITED STATES PATENT OFFICE

FRED WILLIAM MILLER, OF ARMSTRONG, INDIANA

ANIMAL TRAP

Application filed May 15, 1929. Serial No. 363,225.

The object of this invention is to provide an animal trap embodying improvements on that general type of trap having a self-closing door adapted to be released, to enable it to close, when the animal entering the trap steps upon a trigger or trigger-platform.

My improvements relate, more particularly, to the door holding and releasing means whereby said means are susceptible to relatively fine adjustment or setting so that it will be instantly tripped when the animal touches the trigger or the trigger-platform; further, to provide an improved construction and relationship of a live bait compartment and trap compartment; still further, to provide improvements whereby the mounting for the trigger or trigger-platform may be accessible from the exterior of the trap.

The adjusting and operating means whereby the door is held open and is released, is mainly located outside of the trap so that it is accessible for adjustments to meet conditions and enable compensation to be made for the difference in weight between the trap door and the trigger or trigger-platform.

In the accompanying drawings:

Figure 1, is a side elevation, the parts being in set condition;

Fig. 2, is a plan view; and

Fig. 3, is an end elevation.

The trap has a main trapping compartment 1, a live bait compartment 2, and a heavy screen provided with a top 3 and a wall 4, the latter separating compartment 1 from compartment 2 and preventing the animal in compartment 1 from injuring or devouring the live bait in compartment 2.

The screen top 3 enables the light to have access to the interior of the trap and allay the fears of the animal as to entering the compartment 1; also, makes the live bait in the compartment 2 visible and attractive to the animal.

The animal enters the open end 5 of the compartment 1 and is trapped within said compartment by the falling of the gravity-acting door 6, which operates in grooves, channels, or guides 7. A catch 8 engageable with the piece 9 on the door 6, holds the door in closed position. A supplemental opening 10 provided with a vertically slidable closure 11 enables the animal to leave the compartment 1 when the trapper decides to let it out.

The live bait compartment 2 has an hinged door 12 which is held closed by the latch 13, said door being for the introduction, or removal, of the live bait.

Extending cross-wise of the compartment 1 adjacent the lower part of the wire screen partition 4 is a rock shaft 14 which is suitably journalled in the sides of the trap. Secured to this rock shaft is a trigger or trigger-platform 15, screws or other fastenings 16 being used to connect the trigger-platform to the shaft.

To afford access to the screws 16, the bottom of the compartment 1 is provided with a removable section or door 17 held by screws 18.

Rising from the top of the trap is a fulcrum post 19 on whose pointed or fulcrum upper end is fulcrumed the piece whose end 21 is adapted to engage under the piece 9 on the door 6 for the purpose of holding the door 6 in raised position, as shown in Fig. 1.

Suitably journalled on the trap is a crank shaft 22 having a hook 23 on a vertically extending part thereof which is adapted to engage a notch 24 on the inner end of the piece 20. The shaft 22 has a crank 25 whose wrist pin 26 may be inserted in any one of a series of holes 27 in a connecting bar 28.

Passing through a hole in the outer end of the shaft 14 is a hook shaped rod 29 on whose screw threaded part are nuts 30. The nuts 30 enable the hook shaped rod 29 to be adjusted transversely in relation to the shaft 14 to set the hook part of said rod at varying distances from the shaft 14.

The hook part of the rod passes through a hole in the connecting bar 28 and is provided with a wing nut 31 by which any desired frictional engagement may be had as between the bar 28 and the hook part of the rod 29. The purpose of this construction is to balance the difference in weight between the door 6 and the trigger and the trigger-platform 15 so that a delicate adjustment may be had and the trigger 15 rendered sensitive to tripping by the animal. Any suitable friction washers or collars 32 may be provided on the hooked part of the rod 29.

By adjusting the nuts 30 and placing the wrist pin 26 in the hole 27, the platform or trigger 15 may be held at any desired elevation.

Assuming that the parts are in a position shown in Fig. 1, the animal readily observes the bait in chamber 2 because of the access of light through the top 3 to the interior of the compartment 1 and 2. The inside of the trap being well illuminated, the animal is not suspicious of the trap and is inclined to enter the open end 5 and approach the bait in the chamber 2 but on approaching the partition 4, the animal either steps upon, or brushes against, the platform or trigger 15 and upon this occurring, the trigger or platform is depressed, the shaft 14 is rocked, the bar 28 pushed, the shaft 22 turned, and the hook 23 disengaged from the notch 24, whereupon the door 6 will drop and the animal will be trapped.

What I claim is:

1. In an animal trap of the type employing an actuable trigger or trigger-platform, and a self-closing door released by said trigger or trigger-platform, door sustaining and tripping means comprising a linkage having tensioning means whereby compensation may be had for the difference in weight between the door and the trigger or trigger-platform, thereby to render the trap sensitive.

2. In an animal trap of the type employing an actuable trigger or trigger platform, a self-closing door released by said trigger or trigger-platform, comprising a connecting bar, means operated by said bar for sustaining and releasing the door, and an adjustable connection between the bar and the trigger or trigger platform to vary the leverage.

3. In an animal trap of the type employing an actuable trigger or trigger platform, a self-closing door released by said trigger or trigger-platform, comprising a connecting bar, means operated by said bar for sustaining and releasing the door, an adjustable connection between the bar and the trigger or trigger platform adapted to be changed to vary the leverage, and an adjustable connection between the bar and the means for holding and releasing the door, whereby the trigger or trigger-platform may be adjusted to assume different normal positions to vary the leverage and balance the door and platform in respect to each other.

4. The herein-described adjustable and tensionable door-holding and tripping means for an animal trap comprising a pivotally mounted trigger or trigger-platform, a self-closing door, a fulcrumed member for holding said door open, a rock shaft having a hook engaging said fulcrumed member, said rock shaft being provided with a crank, a connecting bar having means whereby the crank may be connected thereto at different points of the length of said bar to vary the leverage, a rod carried by the trigger or trigger-platform and adjustable cross-wise in relation to the pivotal part of said platform to vary the leverage, and a tensionable joint between the said rod and the said bar to increase or decrease the friction and thereby change the sensitiveness of the action of the parts.

In testimony whereof I affix my signature.

FRED WILLIAM MILLER.